United States Patent [19]
Stapleton

[11] Patent Number: 4,885,122
[45] Date of Patent: Dec. 5, 1989

[54] INSTRUMENTATION PORT CLAMPS
[75] Inventor: Cecil R. Stapleton, Pensacola, Fla.
[73] Assignee: Westinghouse Electric Corp., Pittsburgh, Pa.
[21] Appl. No.: 241,820
[22] Filed: Sep. 2, 1988

Related U.S. Application Data
[63] Continuation of Ser. No. 925,863, Oct. 30, 1986, abandoned.

[51] Int. Cl.⁴ .............................................. G21C 13/00
[52] U.S. Cl. ................................... 376/203; 285/367; 285/411
[58] Field of Search ............... 285/364, 365, 366, 367, 285/373, 406, 407, 410, 411; 376/203, 272, 463

[56] References Cited
U.S. PATENT DOCUMENTS

| | | | |
|---|---|---|---|
| 2,775,806 | 1/1957 | Love | 285/411 |
| 2,895,748 | 7/1959 | Oldham | 285/367 |
| 3,484,912 | 12/1969 | Crain | 285/367 |
| 3,544,138 | 12/1970 | Von Eiff | 285/367 |
| 3,600,770 | 8/1971 | Holling | 285/411 |
| 3,744,825 | 7/1973 | Cooper et al. | 285/367 |
| 3,797,078 | 3/1974 | LaPointe | 285/367 |
| 4,079,970 | 3/1978 | Brett | 285/367 |
| 4,131,302 | 12/1978 | Leonard, Jr. | 285/367 |
| 4,657,284 | 4/1987 | Fiori | 285/367 |
| 4,812,285 | 3/1989 | Stapleton | 376/203 |

FOREIGN PATENT DOCUMENTS

| | | |
|---|---|---|
| 0164524 | 4/1985 | European Pat. Off. . |
| 3305526 | 9/1984 | Fed. Rep. of Germany ...... 376/203 |
| 1174474 | 3/1959 | France . |
| 2223620 | 10/1974 | France . |
| 2170562A | 2/1986 | United Kingdom . |

Primary Examiner—Charles T. Jordan
Assistant Examiner—Richard W. Wendtland

[57] ABSTRACT

Clamps and clamping systems for sealing the interface between two generally tubular conduits are disclosed. The clamps of the present invention are especially well adapted for use in nuclear reactor systems, especially as clamps for the instrument port interfaces of nuclear reactors. The clamps are comprised of articulated members pivotally joined by link plates such that the clamp may be opened in jaw like fashion so as to allow easy assembly around the conduits to be sealed. The open ends of the clamps contain datum surfaces which are brought into intimate contact when the clamp is fully assembled. The datum surfaces preload the clamp so as to exert the proper axial pressure on the conduit interface. In one embodiment, the interior surface of the clamp contains a generally flat sloped surface which is used to exert the appropriate axial pressure on the interface between the conduits.

8 Claims, 4 Drawing Sheets

PRIOR ART

INSTRUMENTATION PORT CLAMPS

This application is a continuation of application Ser. No. 06/925,863 filed Oct. 10, 1986, now abandoned.

RELATED APPLICATIONS

This application is related by subject matter to copending application Ser. No. 925,861 which is assigned to the assignee of the present invention and which is incorporated herein by reference.

BACKGROUND OF THE INVENTION

This invention relates to clamps for sealing the instrumentation ports associated with nuclear reactor systems. More particularly, the present invention relates to high quality clamps for maintaining a proper seal at the interface between reactor vessel head penetrations and the thermocouple instrument columns.

Due to the risks associated with operating a nuclear power plant, the design and quality standards associated with nuclear reactor equipment are extremely high and stringent. Accordingly, problems which are capable of straight forward solution in a non nuclear environment are difficult and demanding in the context of a nuclear reactor facility. For example, it is generally required in many industrial settings to monitor the pressure, temperature, and other parameters of various operating equipment. In the environment of a nuclear power plant, this can be extremely dangerous due to the potential for escape of radioactive materials. Accordingly, it is imperative in these situations that the instrumentation used to make such measurements be precisely designed to prevent such leaks.

While the possible escape of radioactive material from a nuclear power plant is minimized by the containment building surrounding the nuclear steam supply system, the working conditions inside the containment building are potentially hazardous even during normal plant operation. This is particularly true during refueling of the reactor when high background and high airborne particulate radioactivity exists in the containment building. Safety regulations set maximum dose limits for the presence of workers in these locations during plant operation and refueling. Many of these same locations are also hazardous during refueling due to the high ambient temperatures. In many situations, these locations are also not easily accessible and a safe work platform is not available. It is accordingly desirable to provide clamping apparatus which are quickly and easily assembled so as to minimize worker exposure to such hazardous conditions. Such quick and efficient repair and/or replacement of instrument port clamps is also highly desirable from the economic point of view since it minimizes the down time of the nuclear plant and hence the cost of providing replacement electricity.

In order to more clearly understand the present invention, one typical instrumentation port interface is revealed in FIG. 1. As revealed by this illustration, a lower conduit or flange 10 is coupled or otherwise mounted to the vessel (not shown) whose parameter is to be measured while the upper conduit or flange 11 is coupled or otherwise mounted to the parameter measuring assembly (not shown). In the particular application of a nuclear power plant, the lower portion of flange 10 is threaded and welded onto the head penetration. Flanges 10 and 11 are generally tubular in shape and have upper and lower surfaces respectively which are designed to engage one another in a sealing manner with respect to gasket 12. In order to effectively compress gasket 12 and seal the interface between flanges 10 and 11, it is desirable for a clamping apparatus to exert axially pressure on flanges 10 and 11. For the instrument port interface shown in FIG. 1, the pressure exerted on each flange should be directed towards the interfacing end of that flange. That is, the clamping apparatus should exert an upward axial force on flange 10 while exerting a substantially equal and axially downward force on flange 11. In this way, the interface between flanges 10 and 11 is properly sealed by gasket 12.

The seal between flange 10 and flange 11 is an important safety consideration in the design of a nuclear power plant reactor. It will be appreciated by those skilled in the art that such flange interfaces are generally located in regions of the plant having a high radioactivity level and high process temperatures. Because of these special circumstances, high quality clamps capable of sealing the interface between flanges 10 and 11 are not only desirable but necessary. In some applications, it is desirable to construct such clamps from high strength material. In addition, it is highly critical to worker safety that the clamping apparatus used to seal such interface be quickly and easily installed and removed.

One heretofore used clamping apparatus, generally designated as 20, is shown in FIG. 2. The clamping apparatus 20 consists of three essentially identical body members 13A, 13B, and 13C. Each body member spans an arc of approximately 110°. An interbody gap 15 of about 10° exists between the body members. Each end of the body members 13A, 13B and 13C contains a flanged portion which is used to attach the body members together. A cap screw 14 (as shown) or other holding means is passed through the flanged ends and holds the body members in a generally ring-shape while the clamp is assembled on flanges 10 and 11.

The use of the clamp 20 on a nuclear reactor vessel instrumentation port interface as shown in FIG. 1 will now be described. Due to its configuration and weight, the clamp 20 of FIG. 2 is generally brought to the instrument port interface in disassembled form. At least two workers are then generally required to assembly clamp 20 in situ around the outer portion of the interface between flanges 10 and 11. Workmen only have access to flanges 10 and 11 from radially outside the reactor vessel head because of the cooling shroud and other equipment permanently installed thereabove. The specified procedure for operation of the heretofore used clamping apparatus requires the use of an axial loading device which seats the gasket prior to the application of the clamp. Such axial loading devices are generally cumbersome and heavy, making the installation thereof extremely difficult. The requirement of this axial loading device also restricts the work space available and therefore complicates the assembly of clamp 20. Once the axial loading device is properly positioned, the interbody gaps 15 must be carefully adjusted so as to be substantially equivalent in order to achieve generally uniform contact and pressure on the flanges 10 and 11, and to minimize cap screw shank bending. The cap screws 14 are generally torqued to about 100 ft/lb Torquing to this extent may require relatively long torquing systems. It should be noted that, in many applications, over torquing of the cap screws 14 may result in overcompression of gasket 12. For many gaskets, overcompression has a serious detrimental impact on the sealing capacity of the gasket. Prior art clamping apparatus generally used space limiters between the flanges in order to prevent such overcompression of the gasket. It is apparent from the above description that the procedures and apparatus required for the assembly of clamp 20 and other prior clamping devices are thus time consuming and present a large potential for improper installation. The above disadvantages are even more pronounced when it is considered that such a clamp must be installed in awkward and precarious positions requiring workers to be tethered by ropes and/or other safety gear and that workers are required to wear cumbersome gear such as masks, heavy gloves, and radiation suits with respirators.

While the use of articulated clamps to overcome some of the disadvantages described above has been known, the heretofore articulated clamps did not completely overcome the problems and difficulties associated with use of such clamps in a nuclear power plant environment. For example, the heretofore used articulated clamps did not solve the serious problem of possible gasket compression and as a result required the use of space limiters. While such space limiters may have been adequate for the intended purpose, their use is prevented in many nuclear power plants systems due to existing space restrictions and existing instrument port flange configurations.

SUMMARY OF THE INVENTION

It is an object of the present invention to provide clamps and clamping systems for use in nuclear reactor and nuclear power plant environments, said clamps providing quick, safe, and easy installation in such environments.

It is a further object of the present invention to provide clamps which apply uniform circumferential clamping pressure without the aid of axial loading devices.

It is yet another object of the present invention to provide a clamping device which avoids overcompression of the sealing gasket without the need for a space limiter.

It is another object of the present invention to provide clamps which minimize the amount of time workers are exposed to hazardous working environments, and to minimize the number of workers so exposed.

It is a still further object of the present invention to provide clamps which are installed and removed by application of relatively low torque without the need for special tools.

According to one embodiment of the present invention, the above and other objects are satisfied by a clamp comprising: a plurality of intermediate body members pivotally joined together to form an intermediate body portion having two ends; two end body members, each of said end body members having an unflanged end pivotally attached to one end of said intermediate body portion and an flanged end; and means for joining the flanged ends.

An instrument port clamp according to another embodiment of the present invention comprises: two end body members, each of said body members having a first end and a second end; means for linking said first ends; and means for releasably joining said second ends, the spacing between said second ends being adjustable when said joining means is released.

Another embodiment provides clamping systems for sealing the interface between two generally tubular bodies comprising: each of said tubular bodies having a clamp receiving portion thereof; and at least one generally ringshape clamp in engagement with said clamp receiving portions, said clamp comprising: two end body members, each of said body members having a first end and a second end; means for linking said first ends such that the spacing between said second ends is adjustable; and means for joining said second ends.

DETAILED DESCRIPTION

Figure 3:
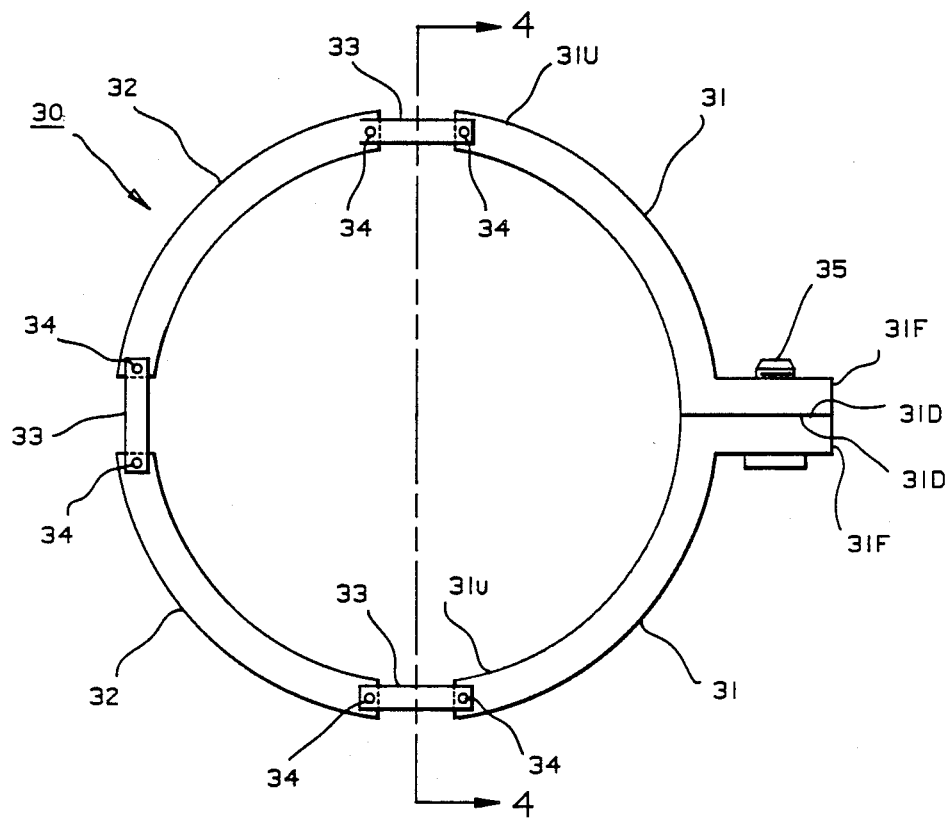
FIG. 3 is a plan view of the clamping apparatus according to one embodiment of this invention.
Figure 4:
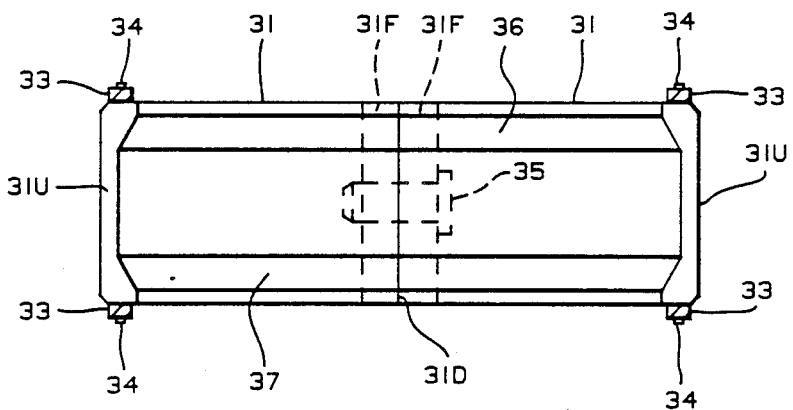
FIG. 4 is a cross sectional view taken along line 4—4 of FIG. 3.

Referring now to FIGS. 3 and 4, one embodiment of the clamping apparatus of the present invention is shown in plan and cross sectional views respectively. The clamping apparatus, generally designated as 30, comprises two end body members 31. Each of the end body members has an unflanged end 31U and a flanged end 31F. In the closed or assembled position, the flanged ends 31F are held together by cap screw 35. In a preferred embodiment, one of the flanged ends 31F contains an unthreaded cap screw aperture therein while the other flanged end 31F contains a threaded cap screw aperture therein. The unflanged ends 31U of the end body members 31F are connected in such a manner so as to allow the radial spacing between the flanged ends 31F to be adjustable. In this way, the present invention provides a unitary clamp having an adjustable end which is adapted to be opened in a jaw like fashion. During the assembly procedure, this feature allows the clamp, which is assembled except for the insertion of the cap screw, to be moved to an open position in which the clamp is easily placed into position over flanges 10 and 11.

In one embodiment of the present invention, the means for linking the end body members so as to permit the spacing between the flanged ends of the clamp to be adjustable comprises intermediate body members 32. Means, such as link plates 33, are provided for pivotally joining the intermediate body members 32 to one another and to the unflanged ends 31U of the end body members 31. Bosses 34 extend substantially axially from each end of the intermediate body members 32 and from the unflanged ends 31U of the end body members 31. Each boss extends into an aperture in link plate 33 in known fashion. In a preferred embodiment, each boss 34 has a holding means, such as a cotter pin for example, for holding the link plates on the bosses. It is preferred that the body members be joined by a pair of link plates 33 as shown in FIG. 4.

It will be appreciated by those skilled in the art that means other than those described in detail above are available for linking the unflanged ends of said end body members. For example, it may be preferable in some applications to provide more than two intermediate body members. In other applications, it may be desirable to extend the arcuate span of the end body members and link the unflanged ends 31U directly together by a link plate.

Figure 1:
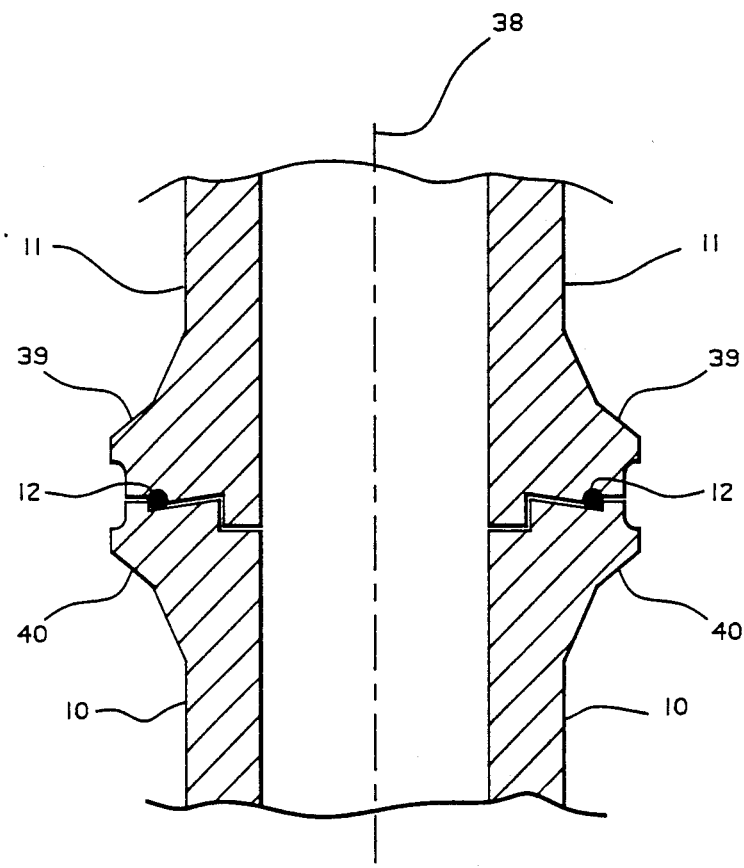
FIG. 1 is a cross sectional view of a typical instrumentation port interface.
Figure 2:
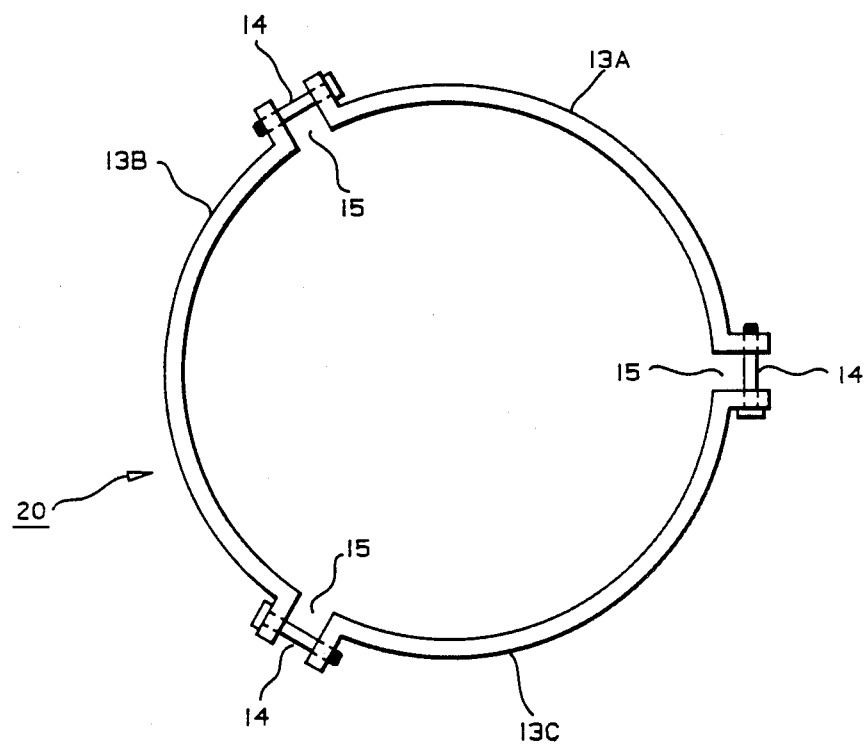
FIG. 2 is a plan view of a prior art clamp apparatus.

The operation of an apparatus according to one embodiment of the present invention may be usefully illustrated by describing the use of the clamping apparatus shown in FIGS. 3 and 4 in connection with the instrumentation port interface shown in FIG. 1.

Due in part to the articulated nature of the clamping apparatus of the present invention, the clamp may be assembled around the instrument port interface shown in FIG. 1 with a minimum of effort. With cap screw 35 removed from the clamping apparatus 30, the flanged ends 31F of the clamp are easily separated in jaw like fashion. In particular, due to the provision of at least two pivotally joined body members 31, the flanged ends 31F are easily separated a sufficient distance to allow passage of the clamp 30 around flanges 10 and 11. The flanged ends 31F are then easily rejoined by cap screw 35.

As revealed by FIGS. 3 and 4, the clamp 30 according to one embodiment of the present invention is generally ring-shape when in assembled form, the inner portion of said ring-shape clamp being adapted to engage the outer portions of flanges 10 and 11. As mentioned above, it is desirable for the clamping apparatus of the present invention to exert the proper axial seating pressure on the flange interface. As best revealed in FIGS. 1 and 4, this is achieved by providing the inwardly facing portions of clamp 30 with generally flat surfaces 36 and 37 which are non-perpendicular with respect to the axis 38 of the flanges 10 and 11. In assembled form, the surfaces 36 and 37 of clamp 30 are generally parallel with respect to surfaces 39 and 40 of flanges 10 and 11 respectively. When clamp 30 is assembled around flanges 10 and 11, the internal diameter of clamp 30 tends to decrease until cap screw 35 draws flanged ends 31F together. This reduction in the internal diameter of clamp 30 in turn tends to cause opposed axially pressure on flanges 10 and 11 as a result of the engagement of surface 36 with surface 39 and surface 37 with surface 40. In order to provide the most precise application of axial pressure, the inwardly facing portions of the clamp 40 are preferably machined, cast, and/or forged to precisely engage the surfaces 39 and 40 of flanges 11 and 10. More particularly, the spacial relationship between the surfaces 36 and 37 of clamp 30 and surfaces 39 and 40 is controlled so that the proper axial pressure is exerted when the flanged ends 31F are in contact.

As mentioned above, it is critical for instrument port interface clamps of the types disclosed herein to achieve and maintain the proper uniform contact and pressure on the interface. Such uniform contact and pressure will insure a properly seated gasket 12 and will prevent gasket over overcompression. In addition this uniform contact and pressure will aid in the maintenance of a proper seal during emergency conditions. These objectives are achieved, in part, by providing a datum surface on the flanged ends 31F of the end body members. According to the present invention, the clamp 30, for example, is machined, cast, and/or forged according to methods well known in the art to exert the proper contact and pressure upon the interface between flanges 10 and 11 when datum surfaces 31D are in contact. By "preloading" the clamp of the present invention in this way, the time required to position and assemble the clamp on the instrument port interface is minimized and the need for a space limiter is eliminated. That is, once the clamp is placed around the flanges in the manner described above, the proper clamp geometry will be achieved when the cap screw is torqued sufficiently to cause intimate contact between the datum surfaces of the flanged ends. This will properly seat and compress the gasket. Further torquing of the cap screw will not overcompress the gasket and is preferred as a means for preloading the clamp flanges so that the gasket will remain seated when the pressure within the flanges increases. In particular, the clamp of the present invention will achieve these objectives upon the application of only about 60 ft/lbs. torque to the cap screw. In a preferred embodiment of the present invention, the datum surfaces are simply the flat surfaces 31D of the flanged ends 31F. It will be appreciated by those skilled in the art, however, that the use of any particular configuration or shape of datum surface is within the scope of the present invention. For example, it may be desirable to provide datum surfaces with mating portions which provide axial alignment of the flanged ends 31F.

Gasket 12 is properly seated by clamping apparatus of the present invention without the need for the heretofore used axial loading device. This advantage is achieved, in part, by providing body members 31 and 32 with an arcuate span which is substantially less than the arcuate span of the body members 13A, 13B, and 13C according to heretofore used clamping apparatus. It is preferred that the body members according to the present invention span an arc no greater than about 90°. Applicant has found that such a reduction in arcuate span and a decrease in the clamp inner radius increases the contact area between the clamp 30 and the flanges 10 and 11. This increased contact aids in the seating of gasket 12 as the clamp 30 is assembled. In addition, the provision of an increased number of body members having reduced arcuate span aids in the seating of the gasket 12 as the clamp 30 is assembled. Providing a clamp according to the present invention eliminates the requirement of an axial loading device and hence simplifies the assembly procedure thereof and reduces the exposure of workers to potentially hazardous conditions.

Figure 5:
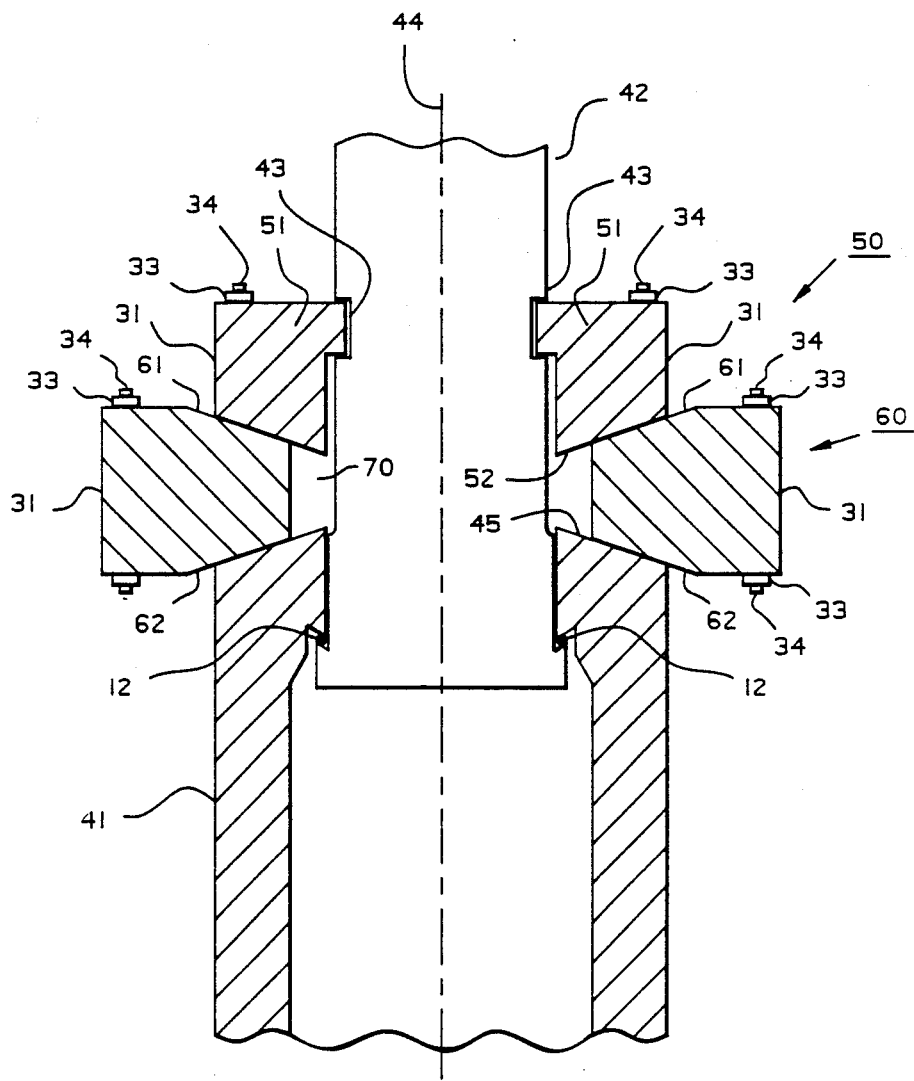
FIG. 5 is a cross sectional view of another embodiment of the present invention.

Referring now to FIG. 5, another embodiment of the clamping apparatus of the present invention is shown in cross sectional view with respect to another typical instrument port interface. In this configuration, tubular members or flanges 41 and 42 cooperate in a telescoping manner to seal the interface therebetween. In the context of a nuclear reactor vessel, flange 41 comprises the upper portion of flange 10 (FIG. 1) and member 42 is the cylindrical conduit seal and carries thermocouples which pass into the interior of member 41. As with the prior interface, a gasket 12 is provided to insure a proper seal between the flanges 41 and 42. In contrast to the interface shown in FIG. 1, proper seating of gasket 12 in FIG. 5 requires application of axial pressure to each flange which is directed away from the interfacing end thereof. That is, it is necessary for the clamping apparatus to exert an upward axially pressure on cylindrical conduit 42 with respect to flange 41. Clamping apparatus heretofore used to achieve this objective are described in copending application Ser. No. 925,861. According to one embodiment of the present invention, this objective is achieved by the cooperation of positioner clamp 50 and wedge clamp 60. Although clamps 50 and 60 may have any appropriate plan view construction, it is preferred to use an articulated construction as shown in FIG. 3. As shown in FIG. 5, however, the cross sectional configuration of clamps 50 and 60, and flanges 41 and 42 is substantially different from the cross sectional configuration of clamp 30 and flanges 10 and 11 as shown in FIGS. 1 and 4. In particular, flange 42 contains an annular groove 43 on its outer surface for receiving positioner clamp 50. Positioner clamp 50 contains an inwardly extending flange 51, at least a portion of which engages groove 43. Positioner clamp 50 also contains a lower surface 52 which is nonperpendicular with respect to the central axis 44 of flanges 41 and 42. In this way, the axial distance between any portion of surface 52 and the end of flanges 41 and 42 is functionally related to the radial distance of that portion from axis 44. In particular, the distance between surface 52 and the end of flange 42 decreases with decreasing surface radius. The upper end of flange 41 contains a generally flat surface 45 which is also generally nonperpendicular with respect to axis 44. The distance between surface 45 and the interfacing end of flange 41 also decreases with decreasing surface radius. As the term is used herein, the end of a flange refers to the furthest axial extent of the flange, For example, the end of flange 41 refers to the innermost radius of surface 45.

Surface 45 and surface 52 cooperate to create a wedge like opening 70 for clamp 60. The inner surface of clamp 60 provides an engaging means adapted to cooperatively engage the wedge like opening 70. In particular, clamp 60 contains an upper surface 61 and a lower surface 62, each of which are also disposed at a nonperpendicular angle with respect to axis 44. It is preferred that surface 62 be in engagement with and generally parallel to surface 45 and that surface 61 be parallel to and in engagement with surface 52, as shown in FIG. 5. Both surfaces 61 and 62 slope towards the axial center of opening 70 as the radial distance from axis 44 decreases. Due in part to the articulated nature of clamp 60 (see FIG. 3), the internal diameter of clamp 60 is reduced as the flanged ends 31F are drawn together. Due to the relationship between the axial and radial distances of the surfaces described above, this reduction in the internal diameter of the clamp 60 in turn tends to exert an upward axially pressure on flange 42 with respect to flange 41.

It will be appreciated by those skilled in the art that various modifications of the clamping system shown in FIG. 5 are possible and may be desirable. In one alternative embodiment, a two-piece split ring may be substituted for positioner 50. It may be desirable in other applications to eliminate positioner 50 entirely and simply form flange 42 with the appropriate outer configuration. It should also be noted, however, that in many situations, nuclear power systems in particular, it is not practical to replace or redesign flange 42 and hence in those applications the provision of a clamp such as 50 may be desirable. Alternatively, positioner 50 and 60 may be combined into a single clamp having an inner surface similar to the combination of the clamp/positioner arrangement. It will also be appreciated by those skilled in the art that while the clamping system shown in FIG. 5 provides sloping surfaces 45, 52, 61 and 62, the provision of only one of these surfaces is sufficient to achieve the objects of the clamping apparatus disclosed therein. For example, it is possible to provide surfaces 45, 52, and 61 in a perpendicular arrangement with respect to axis 44 while maintaining surface 62 in a sloped configuration. Due to the provision of this one sloped surface, assembly of clamp 60 between surfaces 42 and 45 will tend to exert upward axial pressure on flange 42.

As indicated by the foregoing description, the clamping apparatus and systems of the present invention will quickly and efficiently seal instrument port interfaces, thus reducing the exposure of nuclear power plant workers to hazardous conditions while maintaining a high degree of protection against leakage. In particular, the present invention provides a clamping apparatus which, even for relatively large instrument ports, can be easily operated by one worker. In addition, the clamps can be quickly applied to the instrument port interface since only one cap screw is required to assembly the clamp on the interface.

It will be appreciated by those skilled in the art that the form of the invention shown and described above is presented by way of illustration only. For example, the clamping apparatus has been described with respect to use on the generally tubular conduits associated with instrument port interfaces. The present clamping apparatus, however, is adaptable to other conduit configurations, such as square, rectangular or triangular, for example. In addition, the present clamping apparatus may be used in other applications, such as shipping and/or storage casks, for example. Various other changes may be made in the shape, size, etc. without departing from the spirit and scope of the invention as set forth below in the claims.

I claim as my invention:

1. A clamp for sealing the interface between a first generally tubular conduit and a second generally tubular conduit, said tubular conduits being a portion of a nuclear reactor vessel instrument port, the outer surface of the interfacing ends of said conduits being adapted to receive said clamp, said clamp comprising:
    (a) at least two arcuate intermediate body members, each of said intermediate body members having first and second unflanged ends, the arcuate span of each intermediate body member being no greater than about 90°;
    (b) a first link plate pivotally joining said first ends of said intermediate body members;
    (c) two arcuate end body members, each of said end body members having a flanged end and an unflanged end, the arcuate span of each end body member being no greater than about 90°;
    (d) second and third link plates pivotally joining the second ends of said intermediate body members to the unflanged ends of said end body members;
    (e) said flanged ends of said end body members each having a datum surface thereon, said clamp being movable from an open position in which said flanged ends of said clamp can be passed around said tubular conduits to a preloaded position in which said datum surfaces are in intimate contact whereby said intimate contact between said datum surfaces produces the proper axial pressure on said interface and prevents over compression of said interface when said clamp is assembled around said tubular conduits; and
    (f) means is releasably maintaining intimate contact between said datum surfaces.

2. The clamp of claim 1 wherein each of said ends of said intermediate body members and each of said unflanged ends of said end body members have a boss extending axially therefrom, and wherein said link plates pivotally join said body members by linking said bosses together.

3. The clamp of claim 2 wherein each of said link plates has an aperture therein for engaging said bosses.

4. The clamp of claim 1 wherein said means for maintaining comprises a cap screw connecting said flanged ends.

5. A method for sealing the interface between a first generally tubular conduit and a second generally tubular conduit, said tubular conduits being a portion of a nuclear reactor vessel instrument port, the outer surface of the interfacing ends of said conduits being adapted to receive a clamp, said method comprising:

(a) providing a clamp comprising two end body members, each of said end body members having: an inner surface adapted to engage at least a portion of said clamp receiving portion of said tubular conduit; a first end; and a second end, and means for linking said first ends such that the spacing between said second ends is adjustable, said second ends each having a datum surface thereon;

(b) opening said clamp by separating said second ends by a distance greater than about the diameter of said tubular bodies;

(c) placing said clamp in operative association with said clamp receiving portions by passing the open end of said clamp around said tubular bodies; and (d) sealing the interface between said tubular bodies by ensuring intimate contact between said datum surfaces whereby said intimate contact between said datum surfaces produces the proper axial pressure on said clamp receiving portions and prevents oven compression at said interface.

6. The method of claim 5 wherein said clamp further comprises means for releasably maintaining intimate contact between said datum surfaces.

7. The method of claim 6 wherein said step of ensuring intimate contact between said datum surfaces comprises adjusting said maintaining means.

8. The method of claim 6 wherein said first ends of said clamp are pivotally joined.

* * * * *